(12) United States Patent
Watanabe et al.

(10) Patent No.: US 7,919,718 B2
(45) Date of Patent: Apr. 5, 2011

(54) ACCELERATION SWITCH

(75) Inventors: Masayuki Watanabe, Nagoya (JP);
Teruyuki Takeda, Nagoya (JP)

(73) Assignee: Ubukata industries Co., Ltd.,
Nagoya-shi (JP)

(*) Notice: Subject to any disclaimer, the term of this patent is extended or adjusted under 35 U.S.C. 154(b) by 536 days.

(21) Appl. No.: 11/995,816

(22) PCT Filed: Jul. 20, 2006

(86) PCT No.: PCT/JP2006/314404
§ 371 (c)(1),
(2), (4) Date: Mar. 14, 2008

(87) PCT Pub. No.: WO2007/010992
PCT Pub. Date: Jan. 25, 2007

(65) Prior Publication Data
US 2008/0202901 A1    Aug. 28, 2008

(30) Foreign Application Priority Data
Jul. 22, 2005  (JP) ................. 2005-213443

(51) Int. Cl.
H01H 35/02   (2006.01)
(52) U.S. Cl. .................................. 200/61.52
(58) Field of Classification Search ........... 200/61.52
See application file for complete search history.

(56) References Cited

U.S. PATENT DOCUMENTS

| | | | | |
|---|---|---|---|---|
| 3,619,524 A * | 11/1971 | Gillund | ............... | 200/61.45 M |
| 3,927,286 A * | 12/1975 | Fohl | .................. | 200/61.45 R |
| 5,198,628 A * | 3/1993 | Bitko | .................. | 200/61.47 |
| 5,669,147 A * | 9/1997 | Nakajima et al. | ............ | 33/334 |
| 5,837,951 A * | 11/1998 | Kato et al. | ............ | 200/61.45 R |
| 6,180,873 B1 * | 1/2001 | Bitko | .................. | 174/9 F |

FOREIGN PATENT DOCUMENTS

| | | |
|---|---|---|
| JP | 07-103812 A | 4/1995 |
| JP | 07-176246 A | 7/1995 |
| JP | 08-050055 A | 2/1996 |
| JP | 11-190657 A | 7/1999 |
| JP | 02-186224 A | 1/2008 |
| JP | 06-094510 A | 1/2008 |
| JP | 07-169378 A | 1/2008 |

* cited by examiner

*Primary Examiner* — Edwin A. Leon
*Assistant Examiner* — Vanessa Girardi
(74) *Attorney, Agent, or Firm* — Thomas & Karceski, P.C.

(57) ABSTRACT

An acceleration switch includes a closed container further including a cylindrical housing and a substantially circular metal header plate, a conductive lead terminal inserted through a hole of the header plate and hermetically fixed in the hole, a contact member secured to a distal end of the lead terminal and having a plurality of elastically deformable movable contacts substantially concentric about the distal end of the lead terminal, a conductive inertia ball accommodated in the container and caused to roll in the housing thereby to contact the movable contact, whereby the housing and the contact member are rendered conductive, and a braking member disposed between the movable contacts so as to be capable of urging the inertia ball in a direction of a center of the closed container. The braking member includes an elastically deformable braking portion which is extended so as to normally contact the inertia ball.

8 Claims, 6 Drawing Sheets

ACCELERATION SWITCH

CROSS-REFERENCE TO RELATED APPLICATIONS

This application is a National Phase Application based upon and claiming the benefit of priority to PCT/JP2006/314404, filed on Jul. 20, 2006, which is based upon and claims the benefit of priority to Japanese Patent Application No. 2005-213443, filed Jul. 22, 2005, the contents of both of which are incorporated herein by reference.

FIELD OF THE INVENTION

The present invention relates to an acceleration switch for use in seismoscopes or the like.

BACKGROUND ART

An acceleration switch in which an inertia ball (a metal ball or the like) is housed in a metal container is disclosed, for example, by Japanese Patent No. 2892559 (prior art document 1) or Japanese Patent No. 2887556 (prior art document 2).

In these acceleration switches, an inertia ball is rollably housed in a metal housing serving as one electrode. The inertia ball normally remains stationary on a central bottom of the housing. A plurality of movable contacts comprised of contact members are provided uniformly all around the inertia ball. The movable contacts serve as the other electrode. The movable contacts are elastic and are adapted to elastically contact the inertia ball. Furthermore, the movable contacts are disposed relatively more densely around the inertia ball in order that operating characteristics of the acceleration switch may be prevented from being directional. Accordingly, the inertia ball rolls thereby to contact any one or more of the movable contacts when the acceleration switch is subjected to acceleration at or above a predetermined value. In addition, when remaining stationary on the central bottom of the housing, the inertia ball does not contact the movable contacts, whereupon a section between both electrodes (between the housing and the contact members) is rendered nonconductive.

When the acceleration switch is subjected to acceleration, deceleration or oscillation and a horizontal acceleration exceeds a predetermined value, the inertia ball rolls on the housing bottom thereby to contact the movable contacts provided therearound. When the inertia ball contacts the movable contacts, both electrodes of the acceleration switch are electrically connected via the inertia ball as a conductor to each other. Alternatively, a distal end of the movable contact displaced is brought into direct contact with the housing, whereby both electrodes of the acceleration switch are electrically connected to each other.

The following will describe the case where the acceleration switch is used for detection of seismic vibration. Regarding acceleration of vibration assumed in earthquake detection, an inertia ball generally reciprocates in the housing. Accordingly, the inertia ball repeats contact with and separation from the movable contact, so that the acceleration switch intermittently delivers a conduction signal (a signal corresponding to a conductive state of the acceleration switch) according to a vibration frequency or vibration level. Based on a duration of the conduction signal (an ON duration) or number of times, a determining device determines whether an earthquake occurred is at or above a predetermined level.

On the other hand, disturbance due to shock is sometimes given to an apparatus installed with the acceleration switch when a person or substance strikes the apparatus. In this case, a vibration frequency given to the acceleration switch depends upon a resonance frequency of the apparatus but is normally higher than frequencies of seismic vibration obviously. Accordingly, a duration of conduction signal intermittently delivered from the acceleration switch during contact opening and closure is rendered sufficiently shorter than due to an earthquake. As a result, the determining device can discriminate disturbance from an earthquake. Furthermore, when a duration of conductive signal exceeds a predetermined time period, the determining device can also determine that the acceleration switch is in an abnormal condition in which an apparatus installed with the acceleration switch has fallen over or inclined.

However, when a person or a substance happens to strike against an apparatus (a gas meter, for example) installed with the acceleration switch, a relatively larger disturbance is directly given to the acceleration switch. In this case, the determining device sometimes erroneously determines that an abnormal condition such as an earthquake has occurred. For example, as in the acceleration switch disclosed in prior art document 1, an inertia ball subjected to an acceleration due to shock rolls along an inner circumferential surface of the housing when the housing is cylindrical in shape. The inertia ball is usually in contact with any one of the movable contacts such that the conduction signal is continuous without interrupt. Accordingly, although there is actually no problem, the determining device erroneously determines that the apparatus installed with the acceleration switch is in a fallen state. Furthermore, when rolling elliptically, the inertia ball repeats contact with and separation from the movable contact, whereupon the determining device sometimes erroneously determines that an earthquake has occurred.

In view of the foregoing, an acceleration switch with protrusions on the inner circumferential surface of the housing has been proposed as in an acceleration switch disclosed by prior art document 2. According to the acceleration switch, a course of the inertia ball is disturbed by the protrusions even if the inertia ball rolls along the inner circumferential surface of the housing. As a result, the inertia ball cannot stably roll around in the housing but repeats contact with and separation from the movable contact, whereupon the conduction signal is delivered intermittently.

The above-described conventional acceleration switches are each structured so that the determining device can distinctly discriminate a conduction signal due to an earthquake from a conduction signal due to disturbance such as shock. However, even the foregoing conventional acceleration switches deliver a conduction signal corresponding with the conduction signal due to an earthquake or the like in rare cases under specified conditions, so that the determining devices make an erroneous determination.

This phenomenon occurs immediately before convergence of rolling of the inertia ball after the inertia ball has started rolling in the housing by disturbance vibration. The phenomenon is considered to occur immediately before convergence of rolling of the inertia ball when the inertia ball transfers to a circular motion within such a range that the inertia ball does not strike against the inner circumferential surface of the housing having protrusions. More specifically, when rolling, the inertia ball normally contacts the protrusions such that a rolling direction is disturbed, whereby the inertia ball is released from contact with the movable contact. However, when the inertia ball is caused to roll in such a range as not to almost flex the movable contact immediately before rolling convergence, the inertia ball remains in contact with the movable contact adjacent thereto without contact with the protrusion.

In view of the foregoing, a constructions has been proposed for preventing continuous contact between the inertia ball and adjacent movable contacts by reducing the number of movable contacts thereby to increase an intercontact distance or by providing protrusions (colliding portions) between movable contacts. However, when the number of movable contacts elastically contacting the inertia ball is reduced, a force suppressing the movement of the inertia ball (braking force) is reduced such that it becomes difficult to terminate the rolling of the inertia ball. As a result, the inertia ball is in contact with a single movable contact for a longer time period, whereupon a duration of the conduction signal is infrequently increased to or above a predetermined time period immediately before termination of the rolling of the inertia ball.

Thus, earthquake determination conditions are met such that a determining device determines erroneously even when the duration and the number of occurrences of the conduction signal meet respective predetermined conditions as well as when the duration of the conduction signal delivered from the acceleration switch has been increased to or above a predetermined time period. Particularly in collective housing areas, gas meters and the like are in many cases installed along aisles through which persons come and go. Accordingly, the gas meters are subjected to disturbance such as shock in many cases.

SUMMARY

An object of the present invention is to provide an acceleration switch which can prevent erroneous determination by the determining device due to disturbance such as shock.

The present invention provides an acceleration switch which comprises a closed container formed by hermetically securing an open end of a bottomed cylindrical conductive housing to a circumferential edge of a substantially circular metal header plate having a substantially central through hole, the housing having a bottom which is inclined gradually upward from a central part thereof toward an outer circumferential side, a conductive lead terminal inserted through the hole of the header plate and hermetically fixed in the hole by an electrically insulating filler, a contact member conductively secured to a distal end of the lead terminal at the closed container interior side and having a plurality of elastically deformable movable contacts which are substantially concentric about the distal end of the lead terminal, a conductive inertia ball accommodated in the hermetic container, the inertial ball being caused to roll in the housing thereby to contact the movable contact of the contact member, whereby the housing and the contact member are rendered electrically conductive, and a braking member disposed between the movable contacts so as to be capable of urging the inertia ball in a direction of a center of the closed container, the braking member including an elastically deformable braking portion, wherein the braking portion of the braking member is extended so as to normally contact the inertia ball.

According to the acceleration switch of the invention, the rolling of the inertia ball is suppressed by the braking member of the braking portion. A braking effect of the braking portion is relatively increased particularly at a stage where energy of movement of the inertia ball is reduced as on the occasion immediately before termination of the rolling of the inertia ball. As a result, quick termination of the rolling of the inertia ball can be realized, thereby preventing an erroneous determination due to continuance of electrical conduction of the housing and the contact member.

DETAILED DESCRIPTION

The invention will be described in detail with reference to the accompanying drawings.

First Embodiment

Figure 1:
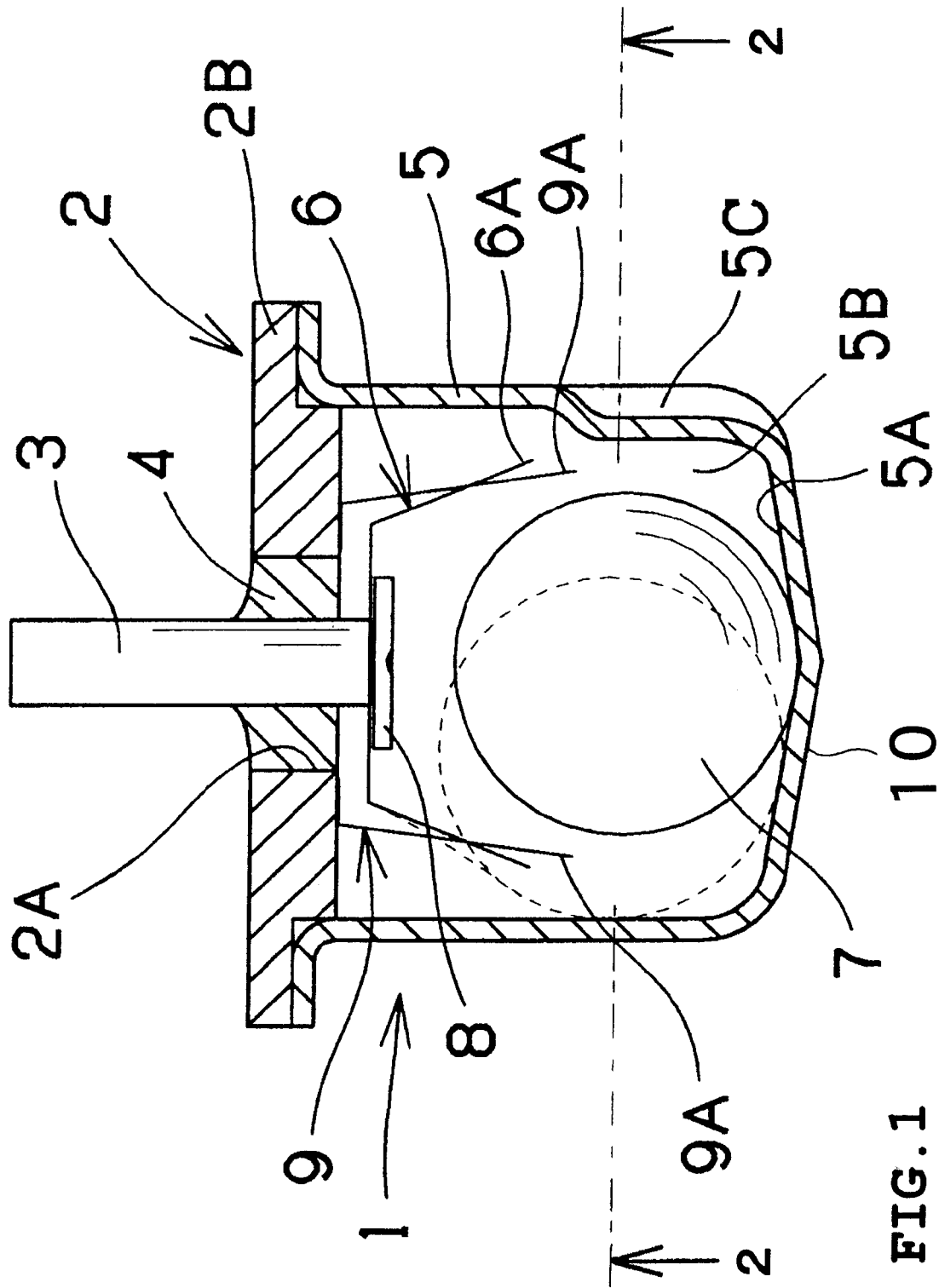
FIG. 1 is a longitudinal side section of the acceleration switch of a first embodiment in accordance with the present invention.
Figure 2:
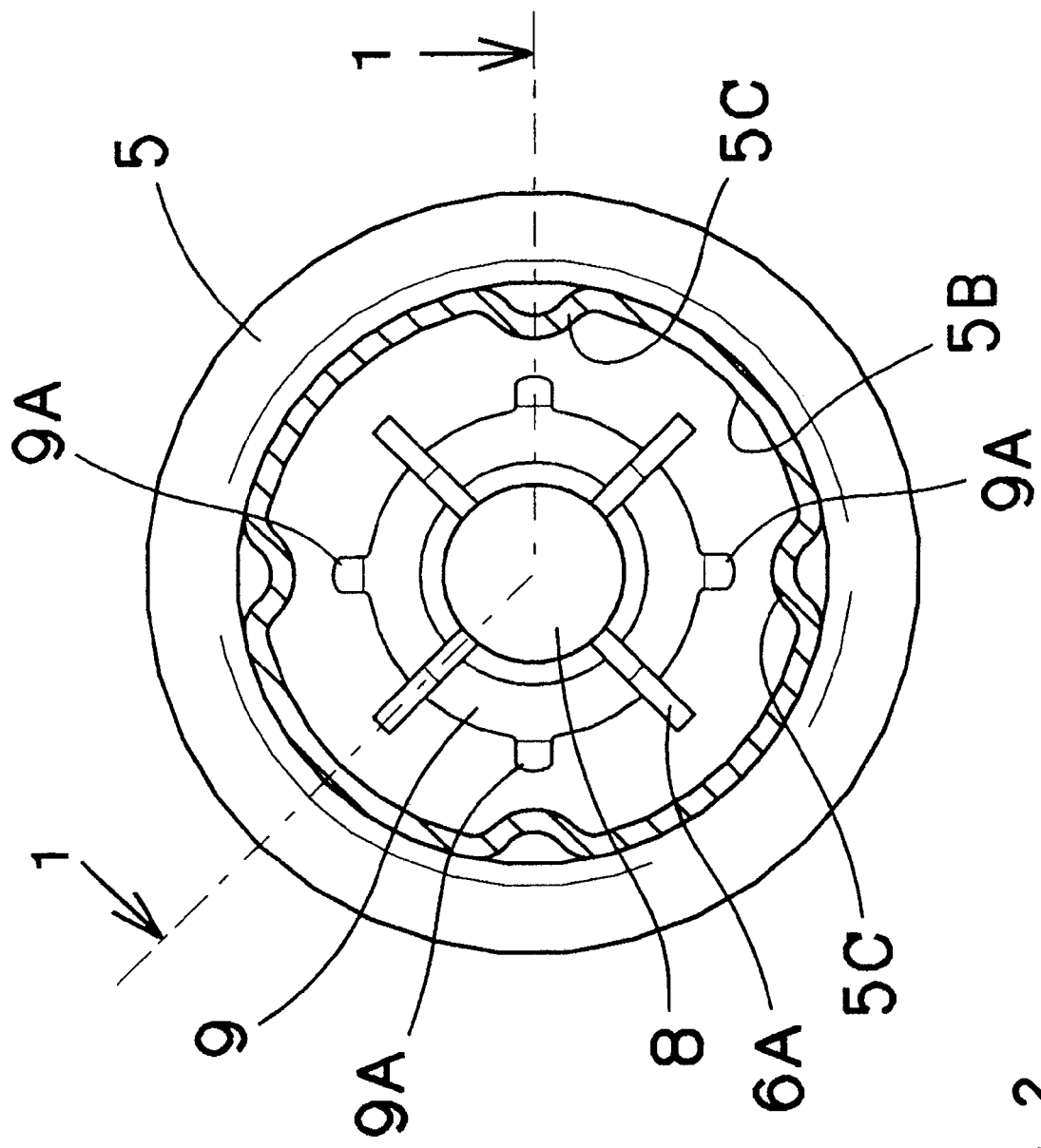
FIG. 2 is a cross-sectional bottom view of the acceleration switch.

A first embodiment of the invention will be described with reference to FIGS. 1 and 2. FIG. 1 is a longitudinal side section taken along line 1-1 in FIG. 2. FIG. 2 is a cross-sectional bottom view taken along line 2-2 in FIG. 1.

The acceleration switch 1 includes a header plate 2 made of a metal and formed into a circular shape. The header plate 2 has a through hole 2A formed through a central part thereof. An electrically conductive lead terminal 3 is inserted through the through hole 2A. The lead terminal 3 is fixed by an electrically insulating filler 4 such as glass. The header plate 2 has a flange 2B formed on a circumferential edge thereof.

A housing 5 is made of a metal and formed into the shape of a bottomed cylinder. The housing 5 has an opening end hermetically fixed to the flange 2B by a process such as a ring projection welding, whereby the header plate 2 and the housing 5 constitute a hermetic container 10. As a result, a volume of contamination preventive gas such as nitrogen filling an interior of the hermetic container 10 can be prevented from leaking for a long period of time. Furthermore, an unnecessary gas can be prevented from entering the interior of the container 10. A bottom 5A of the housing 5 is formed into the shape of an inverted cone so as to be inclined gently upward from a center thereof toward an outer circumference thereof.

A contact member 6 made of an electrically conductive material is conductively secured by welding or the like to a distal end of the lead terminal 3 located in the hermetic container 10. A plurality of feather portions 6A serving as movable contacts is provided on the contact member 6. Each feather portion 6A has a sufficient elasticity. The feather portions 6A are disposed substantially in a concentric fashion about the aforesaid distal end. More specifically, the feather portions 6A extend downward about the lead terminal 3 at the same angle so as to surround the inertia ball 7. Consequently, a contact position where the inertia ball 7 and each feather portion 6A contact each other is located on a circle about the lead terminal 3. Each feather portion 6A extends in a rolling direction of the inertia ball 7 or in a direction approximately perpendicular to the direction of inclination of the housing bottom 5A. As a result, each feather portion 6A more lithely receives the rolling inertia ball 7.

The electrically conductive inertia ball 7 serving as an inertia element is accommodated in the hermetic container 10 so as to be capable of rolling. The inertia ball 7 is located on the center of the housing bottom 5A when usually assuming a normal attitude and being in a stationary state. The inertia ball 7 is an electrically conductive solid sphere made of iron, copper or an iron or copper alloy and rolls on the bottom 5A of the housing 5 thereby to come into contact with or depart from the feather portion 6A when subjected to oscillation due to an earthquake or the like which is equal to or larger than a predetermined magnitude.

The inertia ball 7 rolls to a position where the inertia ball collides with a sidewall 5B of the housing 5. Thus, the rolling of the inertia ball 7 is limited at the colliding position. Accordingly, the center of the inertia ball 7 is normally located nearer to the center side of the housing 5 than to a contact portion (contact position) with the contact member 6. A protecting plate 8 is mounted on an underside of a joint of the lead terminal 3 and the contact members 6. The protecting plate 8 prevents deformation of the contact member 6 due to collision of the inertia ball 7 with a part of the contact member 6 near its root portion.

Four inwardly protruding protrusions 5C (serving as a colliding portion) are provided on the sidewall 5B of the housing 5 at equal intervals as shown in FIG. 2. The protrusions 5C are formed by pressing the housing 5, for example. Thus, since at least one protrusion 5C is provided on the sidewall 5B of the housing 5, the course of the inertia ball 7 is changed by the collision of the inertia ball 7 with the protrusion 5C when the inertia ball 7 starts orbiting along the sidewall 5B. Consequently, the inertia ball 7 is prevented from continuously contacting the feather portion 6A for a predetermined time period or longer such that the acceleration switch is prevented from continuous conduction.

Furthermore, each protrusion 5C is disposed between the feather portions 6A adjacent to each other. Each protrusion 5C is positioned so that the inertia ball 7 and the feather portions 6A are prevented from contact with each other when the inertia ball 7 comes into contact with an apex of each protrusion 5C. Consequently, the inertia ball 7 is prevented from simultaneously coming into contact with the adjacent feather portions 6A. Accordingly, the inertia ball 7 is prevented from continuously coming into contact with the feather portions 6A even when tending to rotate along the feather portions 6A near the center of the housing 5 in the case where the acceleration switch 1 is subjected to weak oscillation or the oscillation is terminated.

A braking member 9 made of a metal includes braking portions 9A each of which is disposed between the feather portions 6A adjacent to each other. The braking member 9 includes a ring-shaped base having a through hole which is formed so as to avoid the lead terminal 3. The base of the braking member 9 is fixed to the header plate 2 by welding or the like. Furthermore, the plural braking portions 9A of the braking member 9 each have a sufficient elasticity as the feather portions 6A. Each braking portion 9A has a distal end located inside relative to the feather portions 6A and is structured so as to come into contact with the inertia ball 7 at a location nearer to the center of the housing 5 than the feather portions 6A. Furthermore, the braking portions 9A are adapted to urge the inertia ball 7 in the direction of the center of the hermetic container 10 (in the direction of the center of the housing 5).

Each of the feather portions 6A and each of the braking portions 9A of the braking member 9 comprise respective thin metal plate and are sufficiently elastically deformable against a pressing force of the inertia ball 7. However, when held between the inertia ball 7 and the sidewall 5B of the housing 5 repeatedly and impulsively, each of the feather portions 6A and braking portions 9A has a possibility of being extended for a long time of service into plastic deformation. In view of the problem, the lengths of each feather portion 6A and each braking portion 9A are set so that each feather portion 6A and each braking portion 9A can be prevented from being directly held between the inertia ball 7 and the sidewall 5B of the housing 5 (or each protrusion 5C). Consequently, each feather portion 6A and each braking portion 9A can be prevented from the plastic deformation due to the collision with the inertia ball 7 even after a long time of service of the acceleration switch 1.

Each protrusion 5C is positioned so that the inertia ball 7 and the feather portions 6A are not brought into contact with each other when the inertia ball 7 comes into contact with the apex of each protrusion 5c. Accordingly, the inertia ball 7 normally comes into contact with one of the feather portions 6A. Furthermore, the inertia ball 7 is prevented from coming into contact with two adjacent feather portions 6A simultaneously. Consequently, the acceleration switch is reliably released from the conducting state even when the inertia ball 7 rolls along the sidewall 5B of the housing 5.

Thus, at least one location is provided where the inertia ball 7 does not come into contact with the feather portion 6A when rolling along the sidewall 5B of the housing 5. Consequently, the inertia ball 7 and the feather portions 6A can be prevented from contact with each other no matter how the inertia ball 7 rolls. Accordingly, the duration of conduction signal is prevented from being increased to or above the predetermined time.

Each feather portion 6A of the contact member 6 has the function of a braking plate suppressing the rolling of the inertia ball 7 as well as the function of a movable contact brought into contact with the inertia ball 7. The braking force of each feather portion 6A is so small that the rolling of the inertia ball 7 due to oscillation (caused by an earthquake, for example) to be detected is not almost affected by the braking force. However, the influence of braking force of each feather portion 6A relatively becomes larger at the time the kinetic energy of the inertia ball 7 is small such as before termination of the rolling of the inertia ball 7. Thus, the braking force of each feather portion 6A has an effect of accelerating termination of rolling of the inertia ball 7.

Accordingly, when the number of feather portions 6A simultaneously contacting the inertia ball 7 is reduced, the braking force of the feather portion 6A is reduced such that a time period necessary for termination of rolling of the inertia ball 7 is increased. Furthermore, a force returning the inertia ball 7 toward the center of the housing 5 is rendered smaller such that a contact time of the inertia ball 7 and each feather portion 6A is increased. Consequently, the duration of conduction signal sometimes reaches a predetermined time for determination of earthquake. When this is repeated in a rare case, there is a possibility of erroneous determination.

In view of the foregoing, a braking member 9 having braking portions 9A is provided as an aid to the feather portions 6A in the embodiment, whereby a braking force is ensured for the inertia ball 7. Each braking portion 9A does not substantially affect the rolling of the inertia ball 7 in the same manner as the feather portions 6A when the kinetic energy of the inertia ball 7 is larger. However, a braking force applied to the inertia ball 7 by each braking portion 9A is relatively larger immediately before termination of rolling of the inertia ball 7 (a stage where the kinetic energy of the inertia ball 7 is smaller). Consequently, the movement of the inertia ball 7 can be terminated more quickly under the condition where there is a possibility of erroneous determination.

Furthermore, the acceleration switch is structured so that during the rolling of the inertia ball 7, the contact location of the inertia ball 7 and the braking member 9 (each braking portion 9) is nearer to the central side of the housing 5 than the contact location of the inertia ball 7 and each feather portion 6A is. As a result, a rolling range of the inertia ball 7 can more quickly be set in the central side relative to the contact location with each feather portion 6A, whereupon generation of a conduction signal resulting in erroneous determination can be suppressed.

Furthermore, the braking member 9 (each braking portion 9A) made of a metal is at the same potential as the housing 5 (but at a different potential from the contact member 6). Accordingly, even when the inertia ball 7 is brought into contact with each braking portion 9A while being out of contact with each feather portion 6A, output of the conduction signal is not affected, and the operating characteristics of the acceleration switch 1 with respect to the oscillation due to an earthquake are not substantially affected.

Second Embodiment

Figure 3:
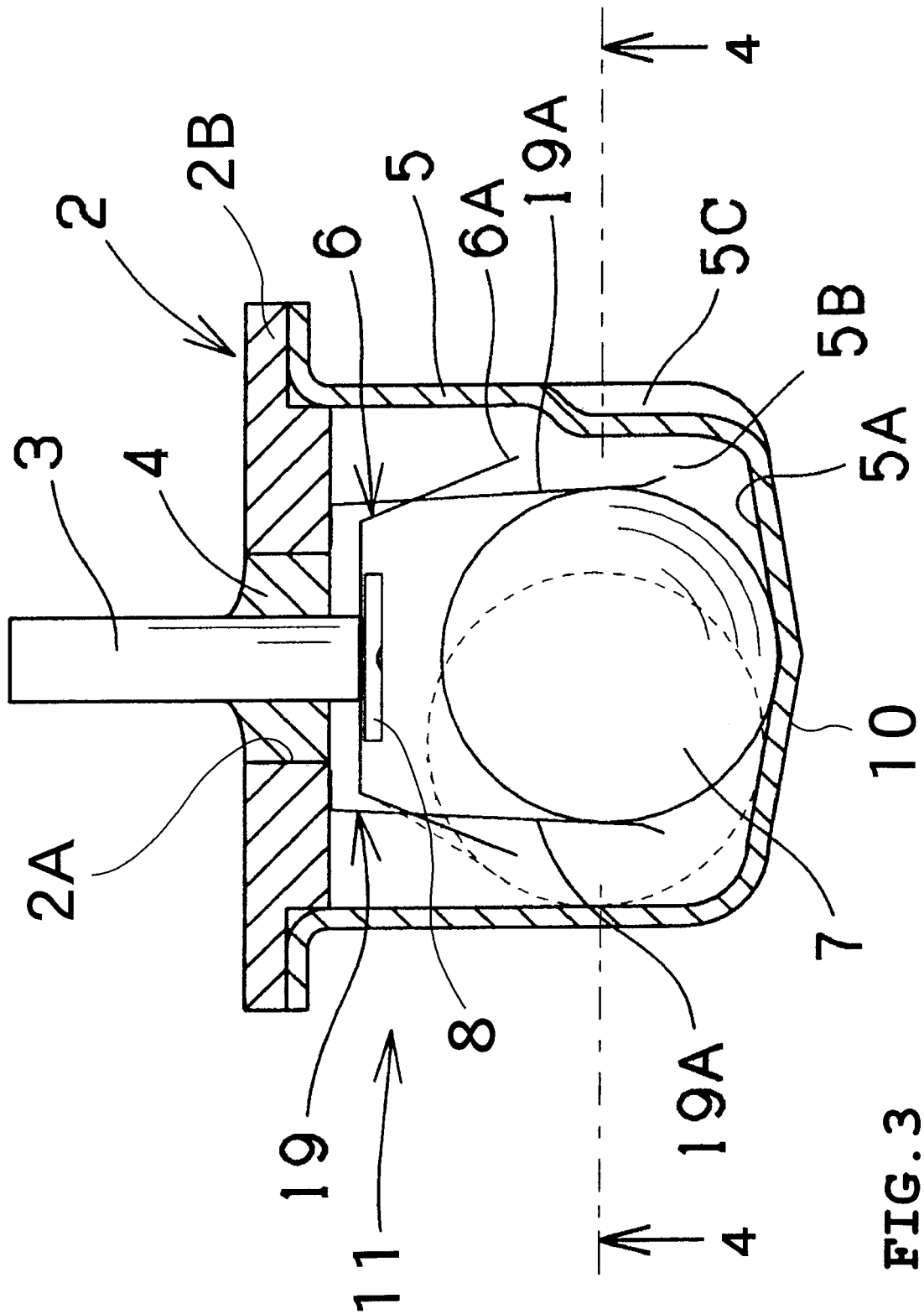
FIG. 3 is a longitudinal side section of the acceleration switch of a second embodiment in accordance with the present invention.
Figure 4:
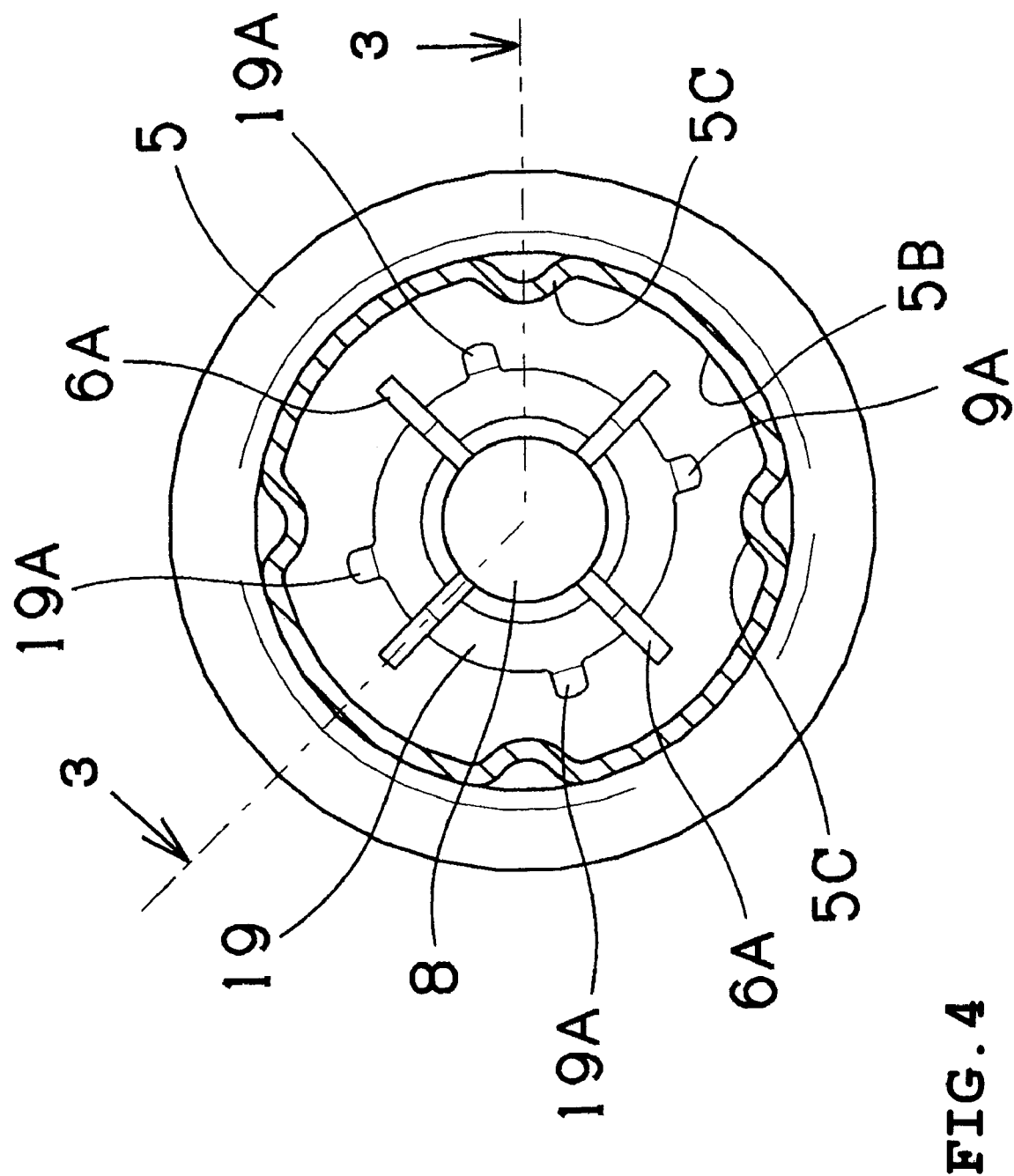
FIG. 4 is a cross-sectional bottom view of the acceleration switch.

A second embodiment of the present invention will now be described with reference to FIGS. 3 and 4. FIG. 3 is a longitudinal side section of the acceleration switch taken along line 3-3 in FIG. 4. FIG. 4 is a cross-sectional bottom view of the acceleration switch taken along line 4-4 in FIG. 3. Identical or similar parts in FIGS. 3 and 4 are labeled by the same reference symbols as in FIGS. 1 and 2, and the description of these parts will be eliminated.

In the acceleration switch 11, the braking portions 19A of the braking member 19 are extended so that portions of the braking portions 19A near to the distal ends normally come into contact with the inertia ball 7. In the first embodiment, the braking member 9 stops affecting the inertia ball 7 when the inertia ball 7 has moved inside the braking member 9. In the second embodiment, the braking effect can be obtained from each braking portion 19A when the inertia ball 7 is stationary. Consequently, the inertia ball 7 can be braked more effectively when the rolling of the inertia ball 7 is terminated, and the inertia ball 7 can be restrained from moving from the center of the housing 5 in subjection to weak oscillation in the environment where the acceleration switch 11 is installed.

Furthermore, each braking portion 19 has a sufficient elasticity as each feather portion 6A in the first embodiment. Accordingly, each braking portion 19A does not substantially affect the rolling of the inertia ball 7 caused by oscillation due to an earthquake or the like and the operating characteristics of the acceleration switch 11.

Furthermore, the braking portions 19A are extended as compared with the braking portions 9A in the first embodiment. Accordingly, when the braking portions 19A are disposed so as to correspond to the respective protrusions 5C as in the first embodiment, each braking portion 19A would be held between the protrusion 5C and the inertia ball 7. As a result, there is a possibility that a long time of service of the acceleration switch may result in plastic deformation of the braking portions 19A. In view of the foregoing, the braking portions 19A are circumferentially shifted slightly from the respective protrusions 5C so that a position offset is provided between the protrusions 5C and the braking portions 19A. Consequently, even when the inertia ball 7 reaches the sidewall 5B of the housing 5, a space is defined around each braking portion 19A so that the braking portion 19A is prevented from being held between the protrusion 5C and the inertia ball 7.

According to the second embodiment, since the inertia ball 7 is normally held by the braking portions 19A, a time period up to the rolling termination can be shortened just before the rolling termination. Additionally, the inertia ball 7 can reliably be prevented from unnecessary movement due to weak oscillation when assuming a stationary state.

Third Embodiment

Figure 5:
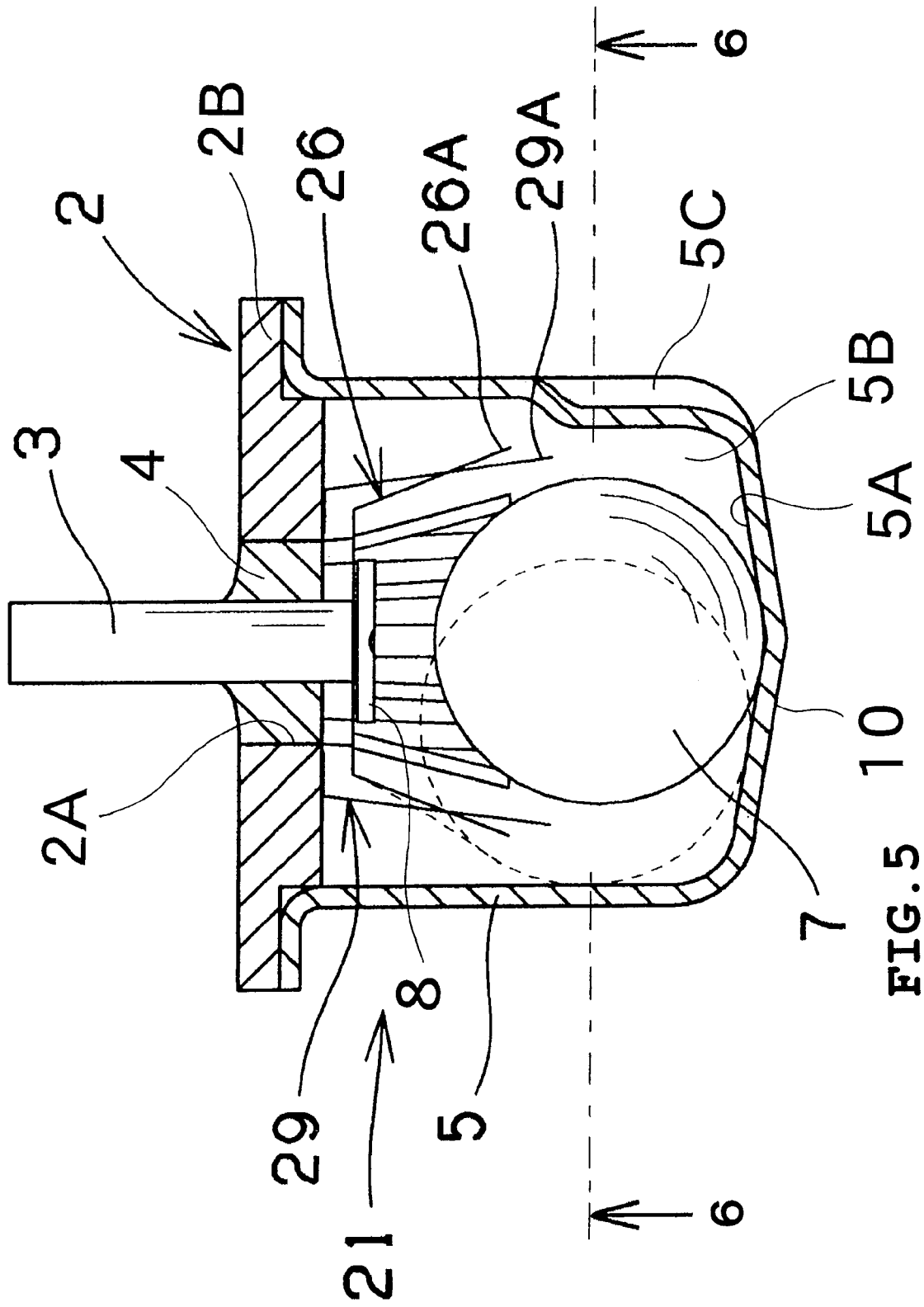
FIG. 5 is a longitudinal side section of the acceleration switch of a third embodiment in accordance with the present invention.
Figure 6:
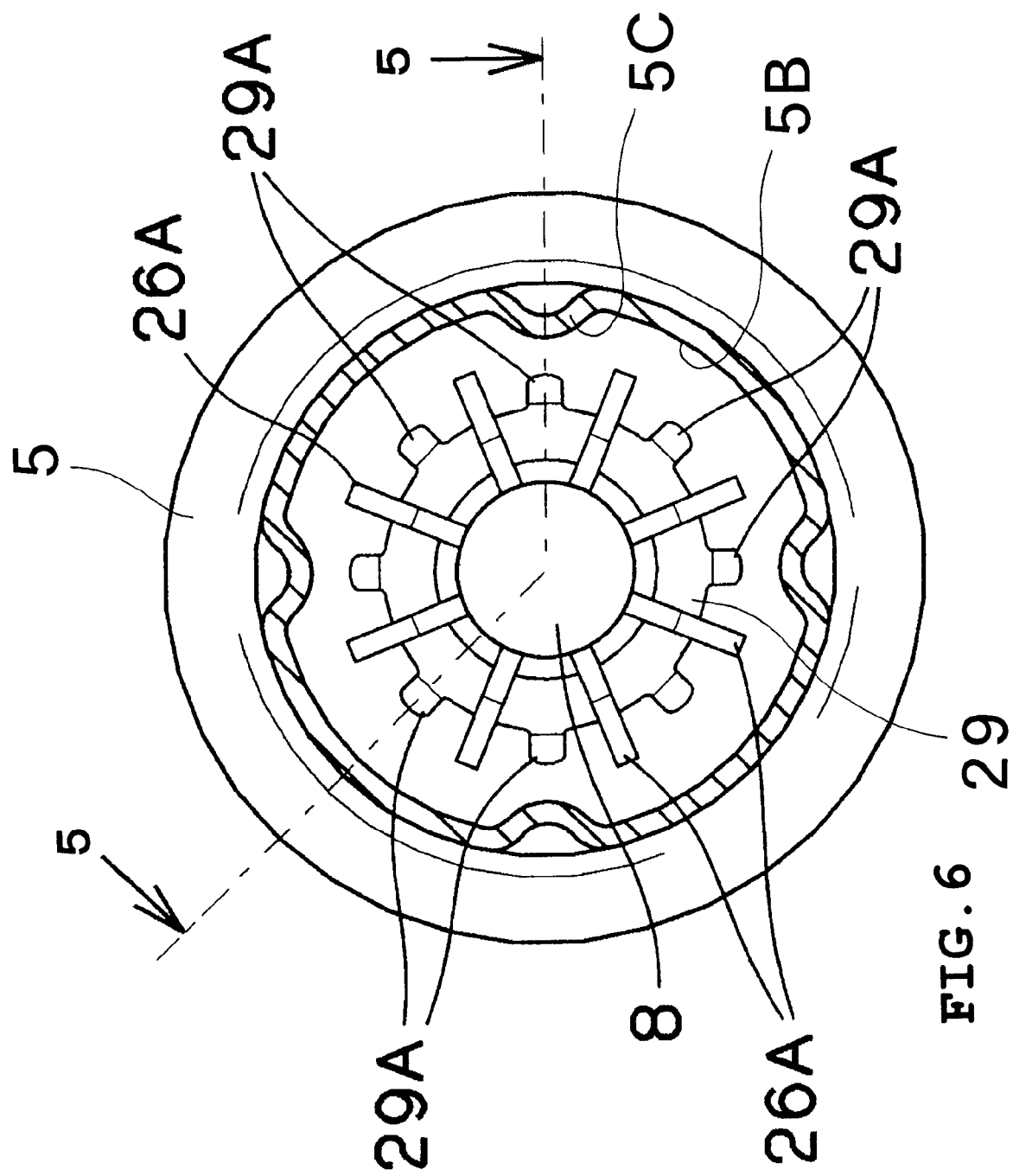
FIG. 6 is a cross-sectional bottom view of the acceleration switch.

A third embodiment of the present invention will now be described with reference to FIGS. 5 and 6. FIG. 5 is a longitudinal side section of the acceleration switch taken along line 5-5 in FIG. 6. FIG. 6 is a cross-sectional bottom view of the acceleration switch taken along line 6-6 in FIG. 5. Identical or similar parts in FIGS. 5 and 6 are labeled by the same reference symbols as in FIGS. 1 and 2, and the description of these parts will be eliminated.

In the acceleration switch 21, the number of the feather portions 26A (serving as movable contacts) is increased from four in the first embodiment to eight. With this, the number of the braking portions 29A of the braking member 29 is also increased to eight. Furthermore, the acceleration switch is structured so that during the rolling of the inertia ball 7 on the bottom 5A, the contact location of the inertia ball 7 and the braking member 29 (each braking portion 29A) is nearer to the central side of the housing 5 than the contact location of the inertia ball 7 and each feather portion 26A is.

A distance between adjacent feather portions 26A is reduced in the third embodiment. Accordingly, the acceleration switch is structured so that the inertia ball 7 is brought into contact with any one of the feather portions 26A when the inertia ball 7 is located at the apex of the protrusion 5C as well as when rolling along the sidewall 5B of the housing 5. However, when a large shock causes the inertia ball 7 to roll along the sidewall 5B of the housing 5, each protrusion 5C disturbs the movement of the inertia ball 7 such that the inertia ball 7 departs from the contact member 26, whereupon the conduction signal is prevented from being continuously generated for a predetermined time or longer due to the shock.

Furthermore, the number of the feather portions 26A of the contact member 26 is increased. In this case, when the inertia ball 7 rolls along the feather portion 26A near the center of the housing 5 during the rolling termination of the inertia ball 7 or in another case, there is a possibility that the inertia ball 7 may keep in contact with the feather portion 26A continuously. In the third embodiment, however, each braking portion 29A provided between the adjacent feather portions 26A absorbs the kinetic energy of the inertia ball 7 so that the rolling of the inertia ball is quickly terminated. Furthermore, since the braking portions 29A are disposed nearer to the central side of the housing 5 than the feather portions 26A. As a result, the braking force of the braking member 29A is continuously applied to the inertia ball 7 even after the inertia ball departs from the feather portion 26A, whereupon the inertia ball 7 more quickly departs from the feather portion 26A.

Furthermore, the inertia ball 7 collides with the braking portion 29A in the case of the rolling thereof due to weak oscillation which does not necessitate the determination of an earthquake, whereupon the inertia ball 7 has a difficulty in contacting the feather portion 26A. Thus, when the kinetic energy of the inertia ball 7 is small, the rolling range of the inertia ball 7 is limited by the braking portion 29A such that the inertia ball 7 has a difficulty in contacting the feather portion 26A. Consequently, the generation of conduction signals resulting in erroneous determination can be restrained in cases other than earthquakes.

Other Embodiments

The invention should not be limited by the foregoing embodiments. The embodiments may be modified or expanded as follows.

The braking portions 9A, 19A or 29A are disposed between the feather portions 6A or 26A of the contact member 6 or 26 in each of the foregoing embodiments. For example, however, the acceleration switch may be structured so that four braking members 9A, 19A or 29A are disposed at equal intervals with eight feather portions 6A or 26A being provided.

Furthermore, when the numbers of the feather portions 26A and the braking members 29A are increased as in the third embodiment, the acceleration switch may be structured so that the inertia ball 29A is normally brought into contact with the braking portion 29A as in the second embodiment.

Furthermore, the direction in which the braking portions 19A are shifted should not be limited to the circumferential direction of the housing 5 in the second embodiment. For example, the braking portions 19A may be shifted upward with respect to the housing 5. The braking portions 19A may be shifted in any direction that can prevent the braking members 19A from being held between the inertia ball 7 and the protrusion 5C.

INDUSTRIAL APPLICABILITY

As described above, the acceleration switch in accordance with the present invention is provided with a braking member separate from a contact member, whereupon a braking force can be applied to an inertia ball even when the number of the contact members is reduced, and a determining device can be prevented from erroneous determination due to disturbance such as shock. Consequently, the acceleration switch is useful for use in seismoscopes detecting an earthquake.

The invention claimed is:

1. An acceleration switch which comprises:
    a closed container formed by hermetically securing an open end of a bottomed cylindrical conductive housing to a circumferential edge of a substantially circular metal header plate having a substantially central through hole, the housing having a bottom which is inclined gradually upward from a central part thereof toward an outer circumferential side;
    a conductive lead terminal inserted through the hole of the header plate and hermetically fixed in the hole by an electrically insulating filler;
    a contact member conductively secured to a distal end of the lead terminal at the closed container interior side and having a plurality of elastically deformable movable contacts which are substantially concentric about the distal end of the lead terminal;
    a conductive inertia ball accommodated in the hermetic container, the inertia ball being caused to roll in the housing thereby to contact the movable contact of the contact member, whereby the housing and the contact member are rendered electrically conductive, and
    a braking member disposed between the movable contacts so as to be capable of urging the inertia ball in a direction of a center of the closed container, the braking member including an elastically deformable braking portion,
    wherein the braking portion of the braking member is extended so as to normally contact the inertia ball.

2. The acceleration switch according to claim 1, wherein a contact location of the inertia ball and the braking portion is nearer to the central side of the housing than a contact location of the inertia ball and the movable contact.

3. The acceleration switch according to claim 2, wherein the housing has an inner circumferential surface provided with an abutment protruding inward.

4. The acceleration switch according to claim 3, wherein the abutments are disposed along the inner circumferential surface of the housing at equal intervals.

5. The acceleration switch according to claim 3, wherein the braking portion of the braking member is disposed at a location out of alignment with a location opposed to the abutment.

6. The acceleration switch according to claim 1, wherein the housing has an inner circumferential surface provided with an abutment protruding inward.

7. The acceleration switch according to claim 6, wherein the abutments are disposed along the inner circumferential surface of the housing at equal intervals.

8. The acceleration switch according to claim 6, wherein the braking portion of the braking member is disposed at a location out of alignment with a location opposed to the abutment.

\* \* \* \* \*